United States Patent
Daining

(10) Patent No.: US 11,272,666 B2
(45) Date of Patent: Mar. 15, 2022

(54) SYSTEM FOR CONTROLLING A BRAKE IN AN AUXILIARY HYDRAULIC SYSTEM

(71) Applicant: Fecon, LLC, Lebanon, OH (US)

(72) Inventor: Stephen Daining, Pella, IA (US)

(73) Assignee: Fecon, LLC, Lebanon, OH (US)

( * ) Notice: Subject to any disclaimer, the term of this patent is extended or adjusted under 35 U.S.C. 154(b) by 484 days.

(21) Appl. No.: 16/097,052

(22) PCT Filed: Apr. 25, 2017

(86) PCT No.: PCT/US2017/029367
§ 371 (c)(1),
(2) Date: Oct. 26, 2018

(87) PCT Pub. No.: WO2017/189551
PCT Pub. Date: Nov. 2, 2017

(65) Prior Publication Data
US 2019/0141897 A1    May 16, 2019

Related U.S. Application Data

(60) Provisional application No. 62/327,833, filed on Apr. 26, 2016.

(51) Int. Cl.
*A01D 69/03* (2006.01)
*A01D 69/10* (2006.01)
*F16H 61/4157* (2010.01)

(52) U.S. Cl.
CPC .............. *A01D 69/03* (2013.01); *A01D 69/10* (2013.01); *F16H 61/4157* (2013.01);
(Continued)

(58) Field of Classification Search
CPC ........ A01D 69/03; A01D 69/10; A01D 34/60; F16H 61/4157; F15B 2211/50545;
(Continued)

(56) References Cited

U.S. PATENT DOCUMENTS 2,984,191 A    5/1961 Smith
3,937,016 A    2/1976 Stan et al.
(Continued)

FOREIGN PATENT DOCUMENTS

CN    203146461 U    8/2013
CN    104831774 A    8/2015
(Continued)

OTHER PUBLICATIONS

International Search Report and Written Opinion of the International Searching Authority for International Patent Application No. PCT/US2017/029367 dated Jul. 25, 2017, 16 pages.

*Primary Examiner* — Alicia Torres
*Assistant Examiner* — Matthew Ian Neal
(74) *Attorney, Agent, or Firm* — Ulmer & Berne LLP

(57) ABSTRACT

An attachment for a tractor includes a rotary reducing component including a plurality of cutters; a hydraulic system having an activated state, a semi-activated state, and a deactivated state; an inlet, an outlet, a hydraulic motor positioned between the inlet and outlet and being mechanically coupled to the rotary reducing component; a first sensor positioned at the inlet for sensing parameters of the activated, semi-activated, or deactivated states; a hydraulic brake positioned downstream of the hydraulic motor configured to restrict flow from the motor to provide hydraulic motor braking only in the deactivated state; and a controller in communication with the first sensor and the hydraulic brake, wherein the controller triggers the hydraulic brake only when the controller determines the first sensor senses a parameter of the hydraulic system being in the deactivated state.

19 Claims, 11 Drawing Sheets

(52) U.S. Cl.
CPC .............. *F15B 2211/50545* (2013.01); *F15B 2211/5153* (2013.01); *F15B 2211/526* (2013.01); *F15B 2211/6313* (2013.01); *F15B 2211/665* (2013.01); *F15B 2211/7058* (2013.01)

(58) Field of Classification Search
CPC ........ F15B 2211/5153; F15B 2211/526; F15B 2211/6313; F15B 2211/665; F15B 2211/7058; F15B 13/02; F15B 1/02
USPC ......................................................... 56/11.9
See application file for complete search history.

(56) References Cited

U.S. PATENT DOCUMENTS

| | | | |
|---|---|---|---|
| 4,022,022 A | 5/1977 | Marietta | |
| 4,209,058 A | 6/1980 | Spalding | |
| 4,749,236 A | 6/1988 | Graham | |
| 5,088,532 A | 2/1992 | Eggers et al. | |
| 5,197,283 A | 3/1993 | Kagiwada et al. | |
| 5,197,284 A | 3/1993 | Cartner | |
| 5,222,875 A | 6/1993 | Clark | |
| 5,381,823 A | 1/1995 | DiBartolo | |
| 6,269,635 B1 | 8/2001 | Zuehlke | |
| 6,581,378 B1 | 6/2003 | Lebrun | |
| 7,150,150 B2 | 12/2006 | Bigo et al. | |
| 7,621,112 B2 | 11/2009 | Slattery et al. | |
| 7,637,102 B2 | 12/2009 | Gest et al. | |
| 7,641,290 B2 | 1/2010 | Miller | |
| 7,726,107 B2 | 6/2010 | Dueckinghaus et al. | |
| 9,109,586 B2 | 8/2015 | Yamada et al. | |
| 9,480,990 B2 | 11/2016 | Beam, III | |
| 2004/0006981 A1 | 1/2004 | Dong et al. | |
| 2005/0166587 A1 | 8/2005 | Reiners et al. | |
| 2006/0032222 A1 | 2/2006 | Slattery et al. | |
| 2006/0192424 A1* | 8/2006 | Perkins | F16H 61/4157 303/11 |
| 2007/0205656 A1 | 9/2007 | Bitter et al. | |
| 2014/0007565 A1* | 1/2014 | Yamashita | E02F 9/2095 60/431 |
| 2014/0190159 A1* | 7/2014 | Tajima | F15B 11/0406 60/466 |
| 2015/0128580 A1* | 5/2015 | Lacher | E02F 9/226 60/327 |
| 2015/0314761 A1 | 11/2015 | Cadeddu | |
| 2015/0334918 A1* | 11/2015 | Daining | A01G 23/00 56/11.9 |
| 2017/0058486 A1* | 3/2017 | Oka | E02F 9/128 |

FOREIGN PATENT DOCUMENTS

| | | |
|---|---|---|
| EP | 1674766 A1 | 6/2006 |
| KR | 20040018855 A | 3/2004 |
| SU | 526504 A1 | 8/1976 |
| SU | 778726 A1 | 11/1980 |
| WO | 2008/086561 A1 | 7/2008 |
| WO | 2015/073529 A1 | 5/2015 |

* cited by examiner

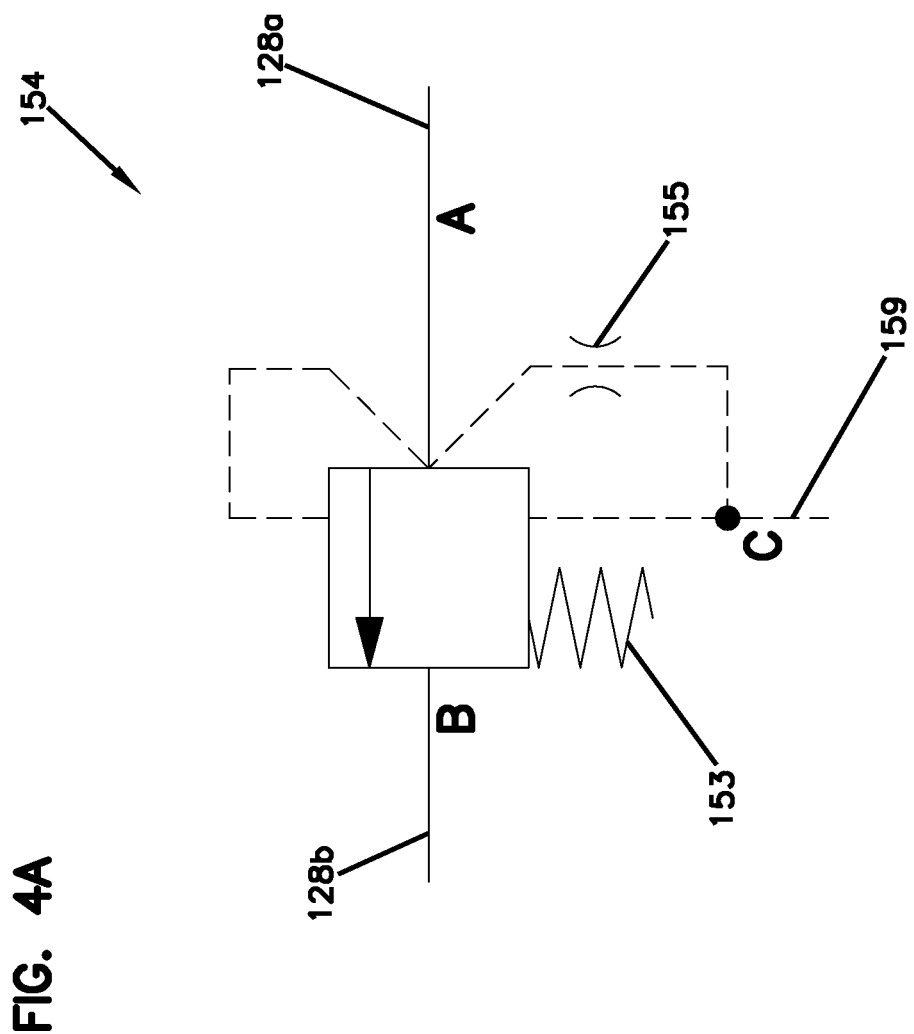

SYSTEM FOR CONTROLLING A BRAKE IN AN AUXILIARY HYDRAULIC SYSTEM

This application is a National Stage Application of PCT/US2017/029367, filed Apr. 25, 2017, which claims the benefit of U.S. Provisional Patent Application No. 62/327,833, filed Apr. 26, 2016, the disclosures of which are hereby incorporated by reference herein in their entireties. To the extent appropriate, a claim of priority is made to each of the above disclosed applications.

BACKGROUND

Material reducing machines are machines used to reduce the size of material by processes such as mulching, chipping, grinding, cutting, or like actions. A typical material reducing machine includes a rotary reducing component that reduces material as the material reducing component rotates about a central axis. In certain examples, the rotary reducing component works in combination with other structures such as screens or anvils to facilitate the material reduction process. In certain examples, the rotary reducing component includes a main rotating body (e.g., a rotor, drum, plate stack, or like structures) and a plurality of reducing elements (e.g., knives, cutters, blades, hammers, teeth, or like structures) carried by the main rotating body. In certain examples, the reducing elements are positioned about a circumference of the main rotating body and are configured to define a circular cutting boundary as the rotary reducing component is rotated about its central axis.

A forestry mower is an example of one type of material reducing machine. A forestry mower typically includes a track or wheel-driven vehicle such as a tractor or skid-steer vehicle. A material reducing head is coupled to the vehicle (e.g., by a pivot arm or boom). The material reducing head includes a rotary reducing component often including a rotating drum that carries a plurality of reducing blades. The material reducing head can be raised and lowered relative to the vehicle, and can also be pivoted/tilted forward and backward relative to the vehicle. By raising the reducing head and tilting the reducing head back, the forestry mower can be used to strip branches from trees and other aerial applications. By lowering the reducing head and pivoting the reducing head forward, the forestry mower can readily be used to clear brush, branches, and other material along or proximate the ground.

SUMMARY

The present disclosure relates generally to a material reducing apparatus. In one possible configuration, and by non-limiting example, a controller is provided to selectively control a rotary reducing component brake based on a parameter measured by a sensor.

In a first aspect of the present disclosure, an attachment for a tractor is disclosed. The attachment includes a rotary reducing component that includes a plurality of cutters and a hydraulic system having an activated state and a deactivated state. The hydraulic system includes an inlet for receiving hydraulic fluid and an outlet for discharging hydraulic fluid. The hydraulic system also includes a hydraulic motor positioned between the inlet and the outlet. The hydraulic motor is mechanically coupled to the rotary reducing component. The hydraulic system includes a first sensor positioned at the inlet of the hydraulic system for sensing parameters representative of the activated or deactivated states of the hydraulic system. The hydraulic system also includes a selectively operable hydraulic brake positioned at the outlet of the hydraulic system. The hydraulic brake is configured to control the rotation of the rotary reducing component when triggered. The attachment also includes a controller in communication with the first sensor and the hydraulic brake. The controller triggers the hydraulic brake when the controller determines the first sensor senses a parameter representative of the hydraulic system being in the deactivated state and the controller disables the hydraulic brake when the controller determines the first sensor senses a parameter representative of the hydraulic system being in the activated state.

In a second aspect of the present disclosure, an attachment for a tractor is disclosed. The attachment includes a rotary reducing component that includes a plurality of cutters and a hydraulic system having an activated state and a deactivated state. The hydraulic system includes an inlet for receiving hydraulic fluid and an outlet for discharging hydraulic fluid. The hydraulic system also includes a hydraulic motor positioned between the inlet and the outlet. The hydraulic motor is mechanically coupled to the rotary reducing component. The hydraulic system includes a restriction element positioned at the inlet that is configured to restrict the flow of hydraulic fluid therethrough. The hydraulic system further includes a first sensor positioned at the inlet of the hydraulic system upstream of the restriction element. The first sensor is configured to sense a first parameter of the hydraulic system. The hydraulic system also includes a second sensor positioned at the inlet of the hydraulic system downstream of the restriction element. The second sensor is configured to sense a second parameter of the hydraulic system. The hydraulic system includes a selectively operable hydraulic brake positioned at the outlet of the hydraulic system. The hydraulic brake is configured to control the rotation of the rotary reducing component when triggered. Further, the attachment includes a controller in communication with the first sensor, the second sensor, and the hydraulic brake. The control system considers the parameters sensed at the first and second sensors to determine if the hydraulic system is in an activated or deactivated state. The controller triggers the hydraulic brake when the hydraulic system is in the deactivated state, and the controller disables the hydraulic brake when the hydraulic system is in the activated state.

In a third aspect of the present disclosure, an attachment for a tractor is disclosed. The attachment includes a rotary reducing component that includes a plurality of cutters and a hydraulic system having an activated state and a deactivated state. The hydraulic system includes an inlet for receiving hydraulic fluid and an outlet for discharging hydraulic fluid. The hydraulic system also includes a hydraulic motor positioned between the inlet and the outlet. The hydraulic motor is mechanically coupled to the rotary reducing component. The hydraulic system includes a pressure transducer positioned at the inlet of the hydraulic system for sensing a pressure representative of the activated or deactivated states of the hydraulic system. The hydraulic system includes a check valve positioned at the inlet of the hydraulic system, downstream from the pressure transducer. The hydraulic system also includes a hydraulic brake positioned at the outlet of the hydraulic system. The hydraulic brake is configured to control the rotation of the rotary reducing component when triggered. The hydraulic brake includes a remote valve having first and second positions. When in a first position, the remote valve triggers the brake; and, when in the second position, the remote valve disables the brake. The remote valve is biased in the first position.

Further, the attachment includes a controller in communication with the pressure transducer and the hydraulic brake. The controller moves the remote valve to the first position when the controller determines the pressure transducer senses a pressure representative of the hydraulic system being in the deactivated state. The controller moves the remote valve to the second position when controller determines the pressure transducer senses a pressure representative of the hydraulic system being in the activated state.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 4a illustrates a schematic of a brake spool valve of FIG. 4;

DETAILED DESCRIPTION

Figure 1:
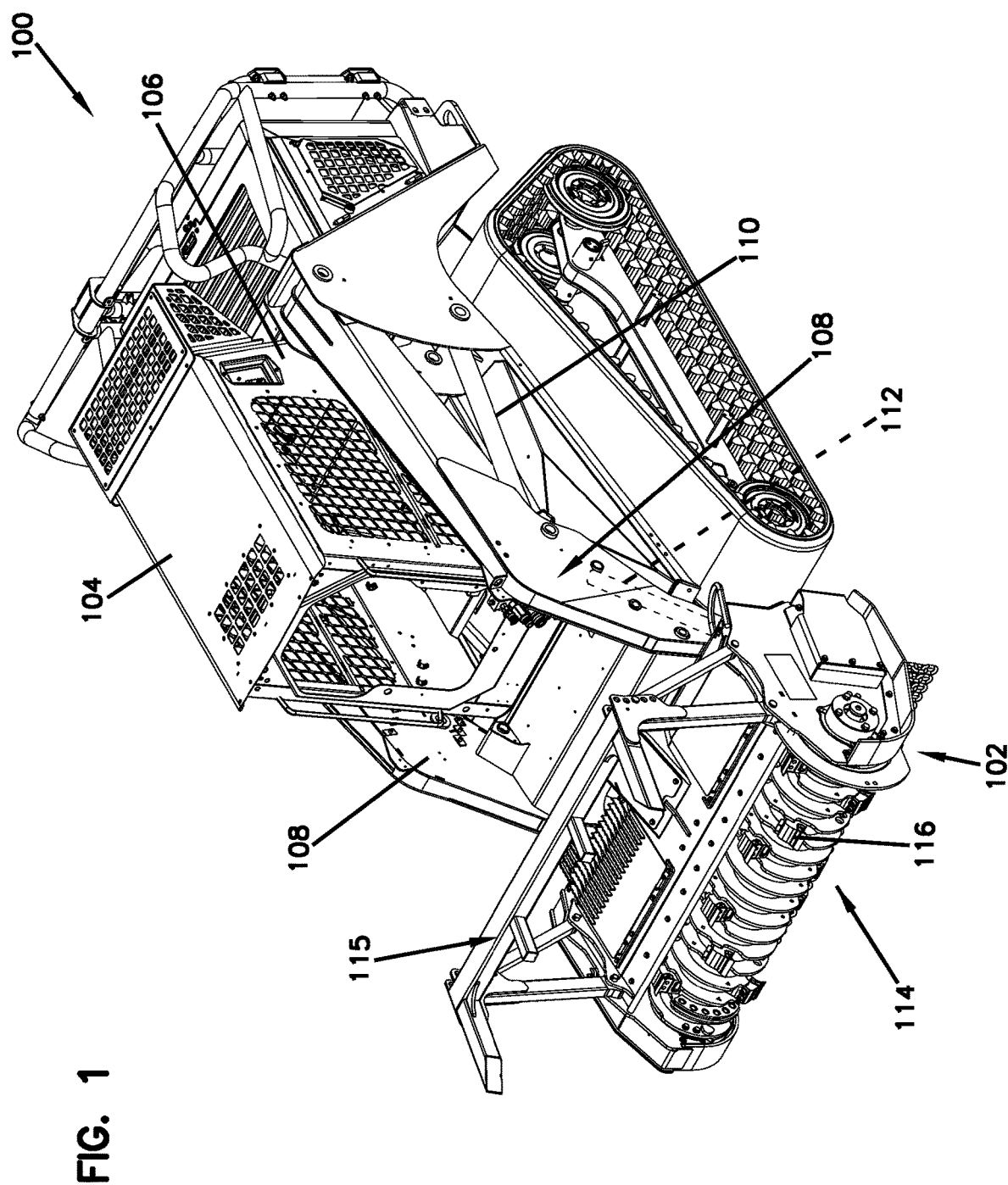
FIG. 1 illustrates a perspective view of a material reducing apparatus according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The machine and associated control system disclosed herein have several advantages. For example, a controller is configured to selectively apply a brake to slow a rotary reducing element of an attachment based on a hydraulic system parameter measured by a sensor. This helps to prevent the system from prematurely applying the brake to the rotary reducing component when a lower than normal fluid flow is provided to a motor that is connected to the rotary reducing component.

Figure 2:
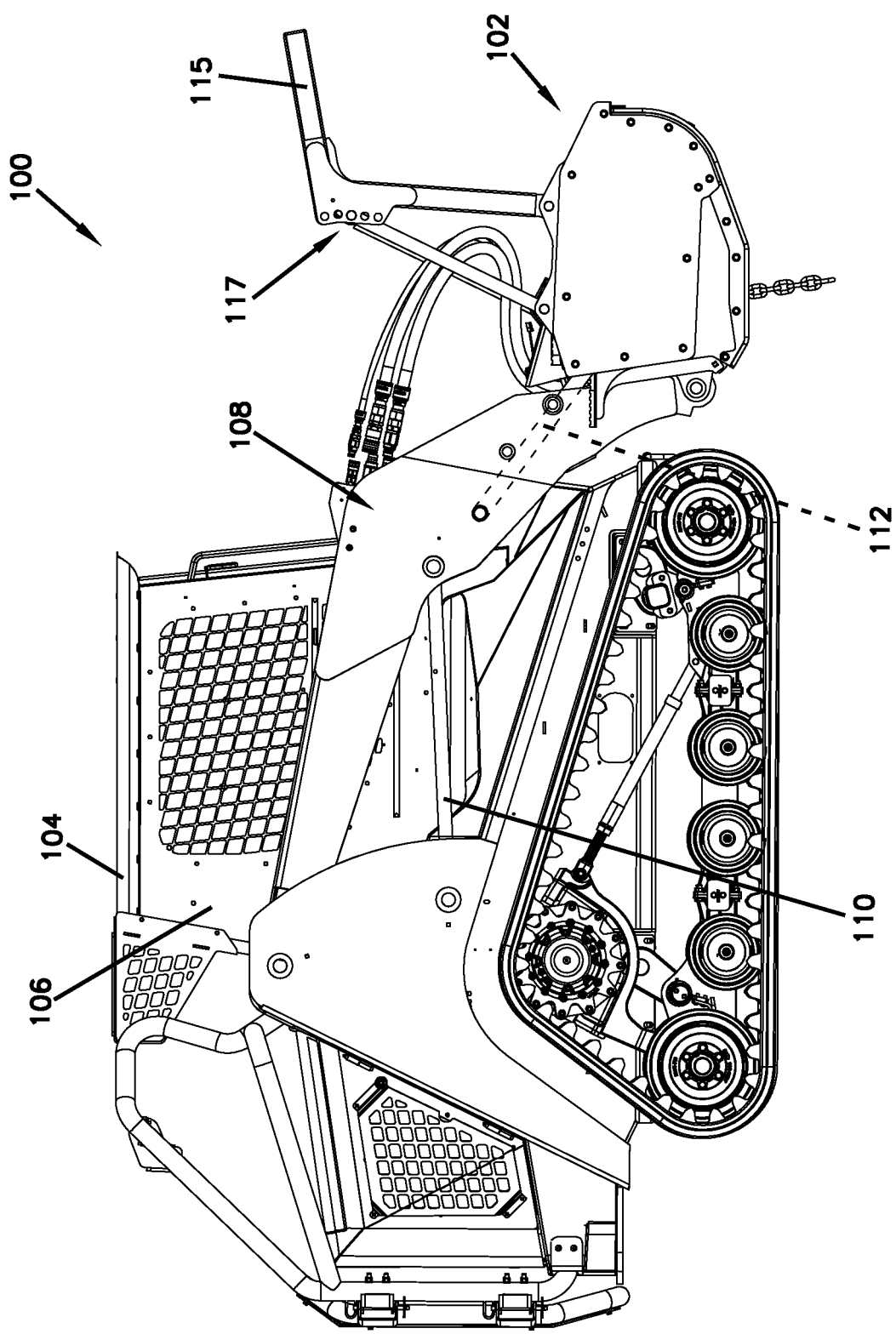
FIG. 2 illustrates a side view of the material reducing apparatus of FIG. 1.

FIGS. 1-2 illustrate a material reducing apparatus in accordance with the principles of the present disclosure. As depicted, the material reducing apparatus is shown as a forestry machine 100 including a material reducing head 102 carried by a vehicle (e.g., a prime mover) 104. The vehicle 104 is depicted as a track loader, but could be any other type of vehicle, such as a wheeled or tracked tractor. The vehicle 104 includes a main frame 106. A linkage (e.g., a boom 108 including a boom arm, a pair of spaced-apart boom arms, or other structures) connects the material reducing head 102 to the frame 106 of the vehicle 104. Cylinders 110 can be used to pivot the boom 108 up and down to raise and lower the material reducing head 102 relative to the frame 106. Hydraulic cylinders 112 can be used to pivot the material reducing head 102 in order, selectively, to tilt the material reducing head 102 forward and rearward relative to the frame 106.

The material reducing head 102 includes a rotary reducing component 114 that is rotated about a central axis. The rotary reducing component 114 can include a drum or other main body which carries a plurality of reducing elements 116 (e.g., blades, cutters). The material reducing head 102 can also include an actuated push bar 115. The push bar can be moved by push bar cylinders 117.

Figure 3:
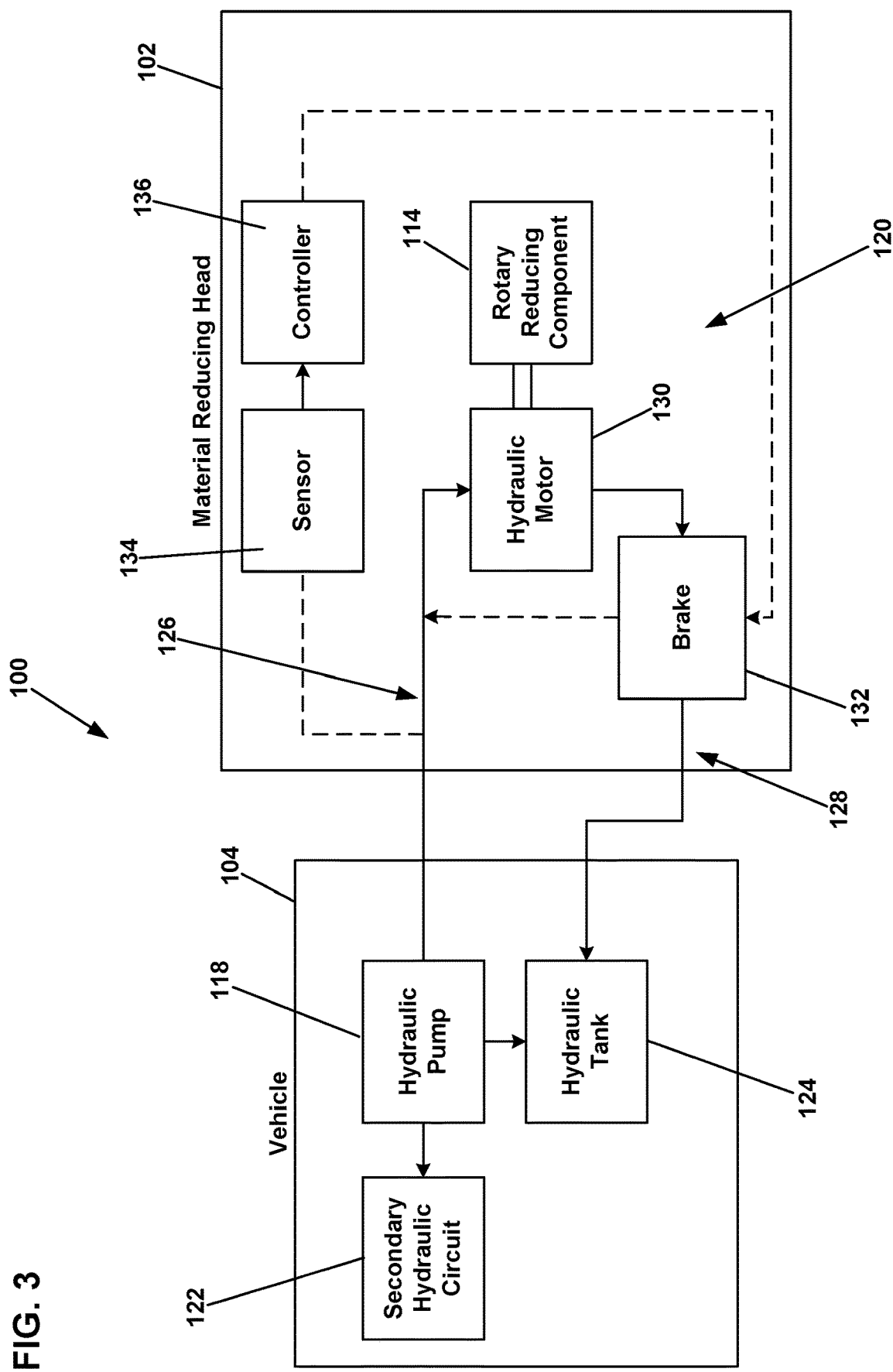
FIG. 3 illustrates a schematic of a material reducing apparatus, according to one embodiment of the present disclosure.

FIG. 3 shows a schematic representation of the vehicle 104 and the material reducing head 102. The vehicle 104 is shown to include a hydraulic pump 118. The hydraulic pump 118 powers a primary circuit 120 and a secondary circuit 122. In the depicted embodiment, the primary circuit 120 resides in the material reducing head 102, and the secondary circuit 122 resides on the vehicle 104. The secondary circuit 122 can include a variety of different hydraulic components. The secondary circuit 122 drives one or more actuators, such as the hydraulic lift cylinders 110 and hydraulic tilt cylinders 112. Further, the vehicle 104 is also shown to include a hydraulic fluid tank 124.

The primary circuit 120 is shown to include an inlet line 126, an outlet line 128, hydraulic motor 130, the rotary reducing component 114, a brake 132, and a sensor 134. A controller 136 is also shown to be in communication with the primary circuit 120. The hydraulic motor 130 is mechanically coupled to the rotary reducing component 114 to power the rotation of the rotary reducing component 114 about the central axis.

The inlet line 126 is in fluid communication with the hydraulic motor 130 and the hydraulic pump 118 of the vehicle 104. Accordingly, the inlet line 126 is configured to receive a flow of hydraulic fluid from the pump 118 to power the hydraulic motor 130 and rotate the rotary reducing component 114. The outlet line 128 is in fluid communication with the hydraulic motor 130, the brake 132, and the hydraulic tank 124.

In particular, when the primary circuit 120 is receiving hydraulic fluid at the inlet line 126 from the pump 118 at a high pressure, the primary circuit 120 is considered to be in an activated state. In some embodiments, the high pressure associated with the activated state is a pressure greater than about 500 psi. When the pump 118 provides fluid flow at a reduced pressure at the inlet line 126 at reduced flow, the primary circuit 120 is considered to be in a semi-activated state. In some embodiments, the reduced pressure associated with the semi-activated state is a pressure between about 100 psi and 500 psi. When pump 118 stops providing fluid flow at the inlet line 126 and the fluid pressure is low, the primary circuit 120 is considered to be in a deactivated state. In some embodiments, the low pressure associated with the deactivated state is a pressure less than about 100 psi.

The primary circuit 120 is shown to further include the brake 132. The brake 132 can be a hydraulic brake that is configured to help slow down and/or stop the rotation of the rotary reducing component 114 by controlling the operation of the motor 130 by using hydraulic fluid. For example, to slow down the motor 130, the brake 132 provides a restriction to fluid flow at the outlet line 128 of the primary circuit 120. By doing this, hydraulic pressure is built up at the outlet line 128, providing a braking function that resists continued rotation of the hydraulic motor 130, thereby slowing the attached rotary reducing component 114.

The sensor 134 is shown to be in communication with the inlet line 126 of the primary circuit. The sensor 134 is configured to sense parameters representative of the primary circuit 120. Specifically, the sensor 134 is configured to sense parameters of the primary circuit 120 (such as a pressure or a flow rate) that are representative of the activated, semi-activated, and deactivated states. In some embodiments, the sensor 134 is a pressure transducer that is configured to measure the hydraulic pressure at the inlet line 126.

The controller 136 is shown to be in communication with both the sensor 134 and the brake 132. The controller 136 is configured to receive, as inputs, signals from the sensor 134. The controller 136 then determines if the signals it receives from the sensor 134 are representative of the activated, semi-activated, or deactivated state of the primary circuit. In some embodiments, the controller 136 can accomplish this determination by using a predetermined look-up table of pressure values that are associated with the particular states of the primary circuit 120. Once the controller 136 determines the state of the primary circuit 120, the controller 136 then determines what output signal to send to the brake 132.

When the controller 136 determines the sensor 134 senses that the primary circuit 120 is in the deactivated state, the brake 132 is triggered. This will cause the brake 132 to resist hydraulic fluid flow out at the outlet line 128, thereby slowing down the motor 130 and the attached rotary reducing component 114.

When the controller 136 determines that the sensor 134 senses that the primary circuit 120 is in the activated or semi-activated state, the brake 132 is not triggered. This prevents the brake 132 from resisting fluid flow at the outlet line 128, thereby allowing the motor 130 to continue operating without a braking force being applied thereto. Further, this helps to prevent premature braking when the primary circuit 120 is in the semi-activated state.

Figure 4:
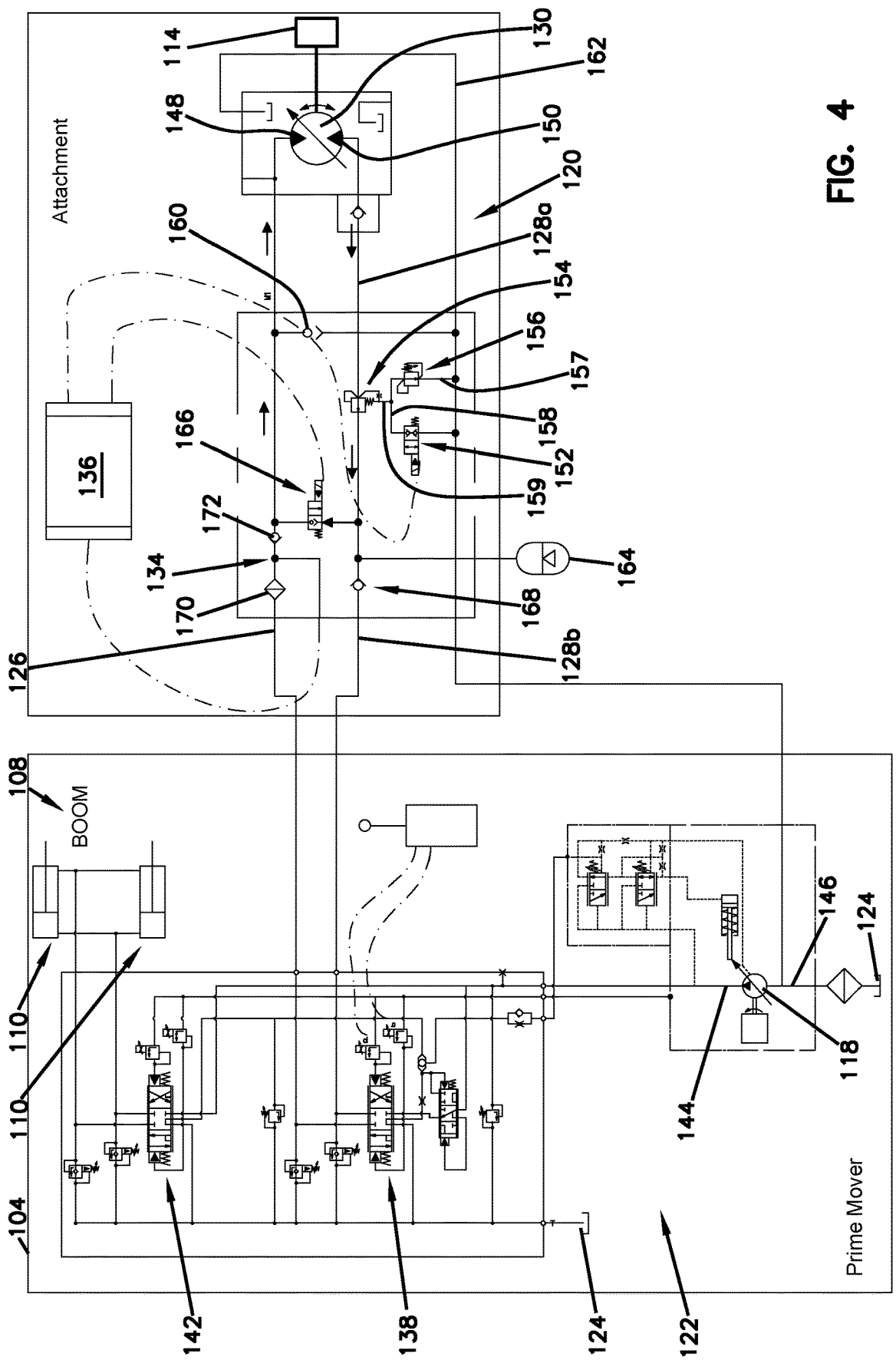
FIG. 4 illustrates a detailed schematic of the material reducing apparatus of FIG. 3 when a primary circuit is in a deactivated state, with a brake triggered.
Figure 5:
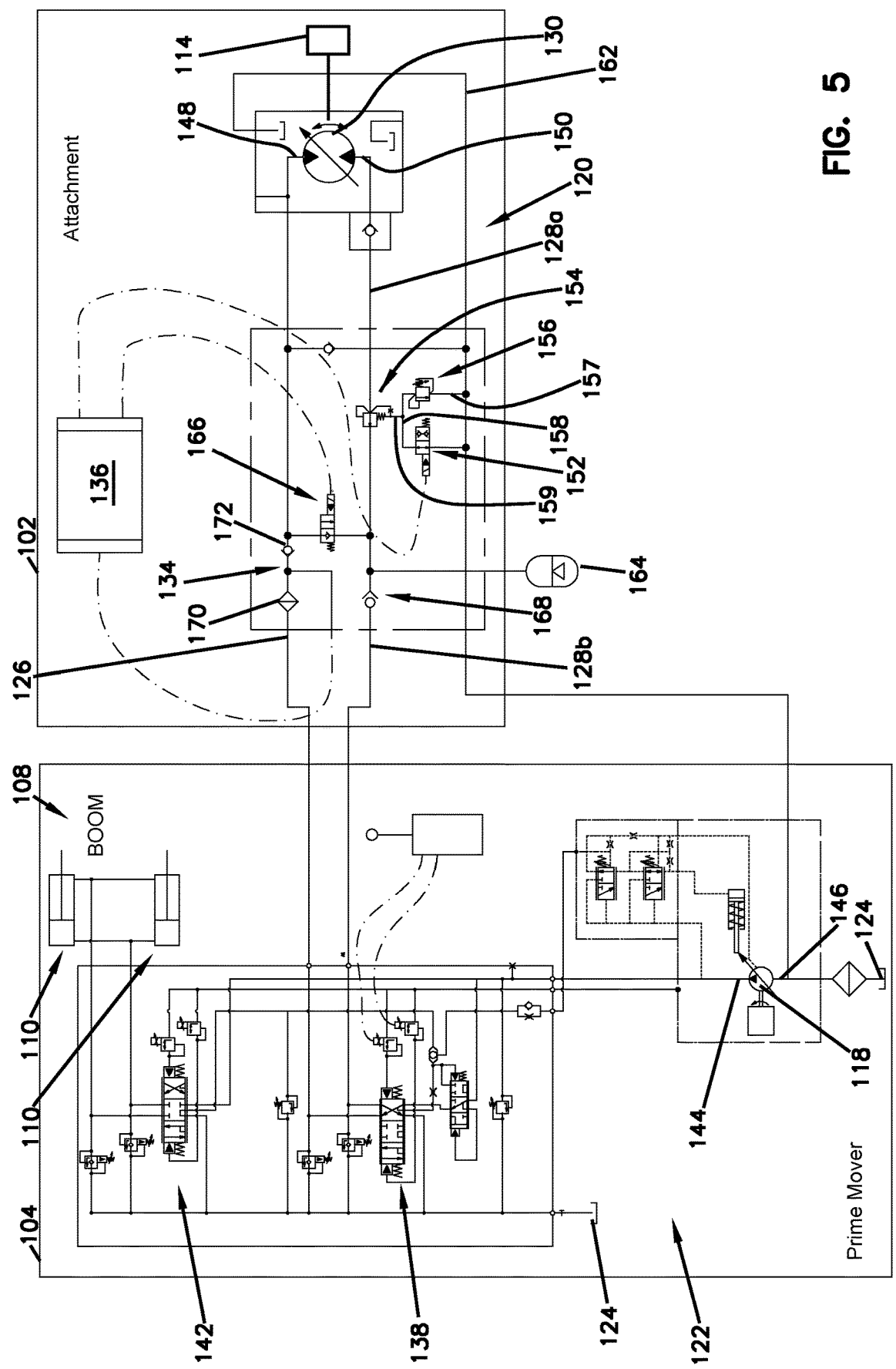
FIG. 5 illustrates a detailed schematic of the material reducing apparatus of FIG. 3 when the primary circuit is in an activated state.
Figure 6:
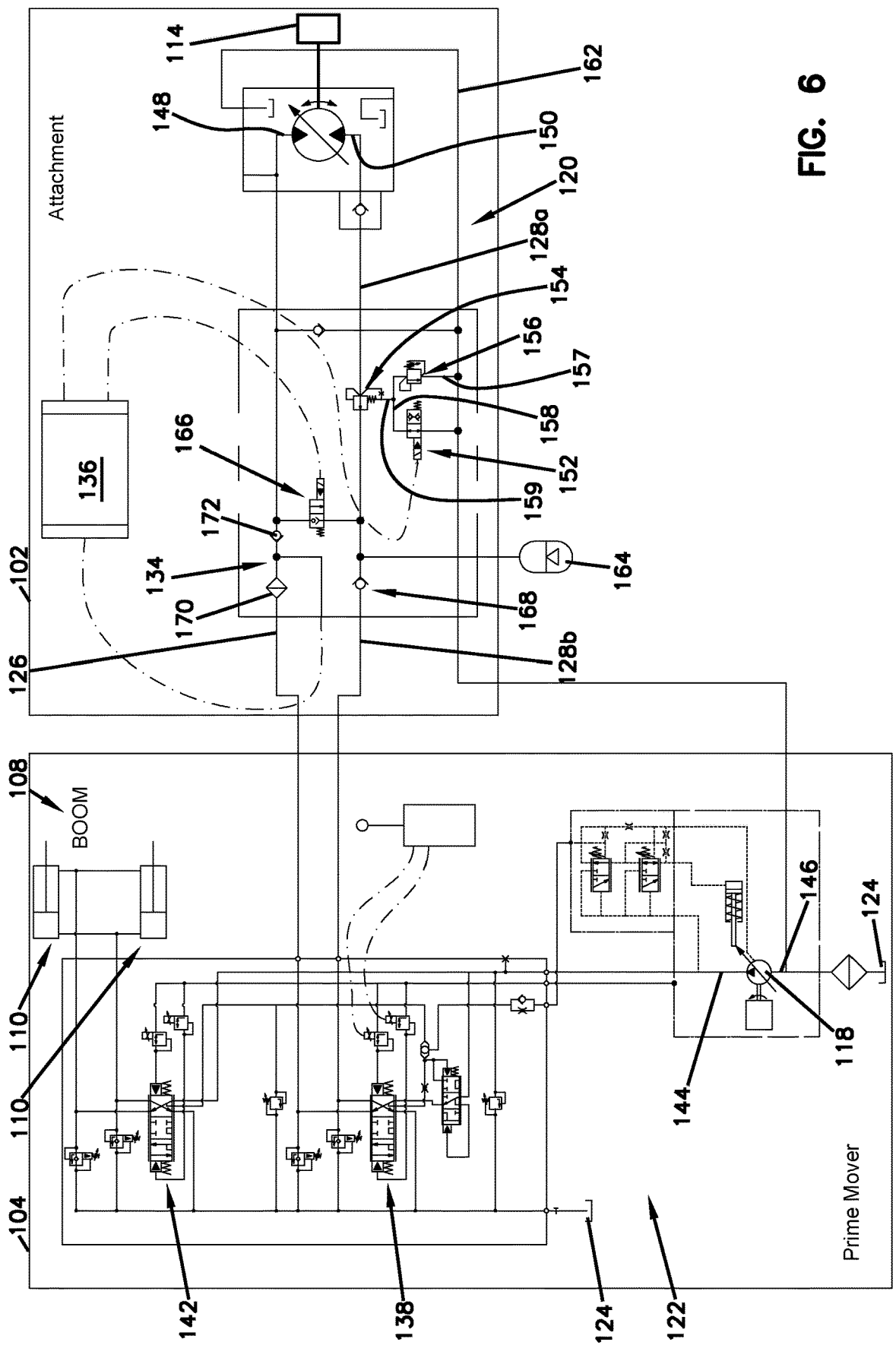
FIG. 6 illustrates a detailed schematic of the material reducing apparatus of FIG. 3 when the primary circuit is in a semi-activated state.

FIGS. 4-6 show the primary circuit 120 and the secondary circuit 122 of the material reducing head 102 and vehicle 104, respectively. The deactivated state is shown in FIG. 4, the activated state is shown in FIG. 5, and the semi-activated state is shown in FIG. 6.

FIG. 4 shows the primary and secondary circuits 120, 122 when the primary circuit is in the deactivated state. The secondary circuit 122 is shown to include the pump 118, a control valve 138, lift hydraulic cylinders 110, and a boom control valve 142.

During braking, i.e., when the brake 132 is triggered, the controller 136 deactivates a rotor-on valve 152. When not braking, i.e., when the brake 132 is not triggered, the controller activates the rotor-on valve 152. Therefore, in the depicted embodiment, the rotor-on valve 152 and the brake 132 have an inverse relationship. Both the brake 132 and the rotor-on valve 152 will be described in more detail below.

While the lift hydraulic cylinders 110 shown can be used to raise and lower the boom 108, in others examples, the hydraulic cylinders 110 can be representative of one or more hydraulic cylinders present in a secondary circuit 122 powered by the hydraulic pump 118, the secondary circuit 122 being parallel to the primary circuit 120. Example hydraulic cylinders can include the hydraulic head tilt cylinders 112 or the push bar cylinders 117. A number of separate secondary hydraulic circuits arranged in parallel with the primary hydraulic circuit 120 can be provided for other secondary loads such as the tilt cylinders 112.

The hydraulic pump 118 powers the primary and secondary circuits 120, 122 and includes a high pressure side 144 that fluidly couples to the circuits 120, 122 to provide hydraulic fluid pressure and flow to the circuits 120, 122 but may not be sized to accommodate all parallel secondary circuits along with the primary circuit. The hydraulic pump 118 also has a low pressure side 146 fluidly coupled to the tank 124.

The primary hydraulic circuit 120 includes the inlet line 126 and the outlet line 128. The inlet line 126 connects the control valve 138 to an inlet 148 of the hydraulic motor 130. The outlet line 128 extends from the control valve 138 to an outlet 150 of the hydraulic motor 130.

The primary hydraulic circuit 120 further includes the brake 132. The brake 132 is shown to include the rotor-on valve 152, a brake spool valve 154, and a brake relief valve 156. As shown, the outlet line 128 includes a first portion 128a that extends between the motor 130 and the brake spool valve 154, and a second portion 128b that extends from the brake spool valve 154 back to the control valve 138.

The rotor-on valve 152 is shown positioned on a rotor-on line 158 and is configured to be selectively energized by the controller 136 for selectively activating the brake 132 when the controller 136 decides that the primary circuit 120 is in the deactivated state. For example, when the rotor-on valve 152 is energized (i.e., brake 132 is not triggered), no braking force is applied to the motor 130. When the rotor-on valve 152 is de-energized (i.e., brake 132 is triggered), a braking force is applied to the motor 130.

The spool valve 154 is positioned along the outlet line 128. A close-up schematic of the spool valve 154 is shown in FIG. 4a. As shown, the brake spool valve 154 includes inlet port A, outlet port B, remote control port C, and a spring 153. Port A is in fluid communication with the first portion of the output line 128a. Port B is in fluid communication with the second portion of the output line 128b. Port C is in fluid communication with a remote line 159. In the brake spool valve 154, the pilot pressure of 128a at port A pushes the brake spool valve 154 to an open position. The spring 153 and the pilot pressure of the remote line 159 at port C push the brake spool valve 154 to the closed position. Therefore, to initially open the brake spool valve 154, the pilot pressure at port A must be able to at least overcome the force of the spring 153. In some embodiments, the spring force is equal to about 50 psi.

Within the brake spool valve 154, an internal orifice 155 connects the inlet port A with the remote control pilot port C. In one embodiment, the pilot flow is about 0.1 gal/min between the inlet port A and remote control pilot port C. The remote pilot port C is connected to the rotor-on valve 152 and the brake relief valve 156 via the remote line 159. Therefore the braking can be controlled by building or relieving pilot pressure in the remote line 159.

When the rotor-on valve 152 is energized, and the brake 132 is not triggered, the pilot fluid in the remote line 159 is allowed to dump to a case drain 162. This causes a minimal pressure to be required at port A (i.e., the spring pressure) to push the brake spool valve 154 open. When open, free fluid flow through the brake spool valve 154 along the output line 128 is permitted.

Conversely, when the rotor-on valve 152 is de-energized, and the brake 132 is triggered, fluid in the remote line 159 cannot pass to the case drain 162 via rotor-on valve 152 and the rotor-on line 158. Further, pressure builds in the remote line 159 until achieving a relief pressure of the relief valve 156, at which time, the fluid in the remote line 159 then dumps to the case drain 162 via a relief line 157, on which the relief valve 156 is positioned. In some embodiments, the relief pressure setting of the relief valve 156 is about 1900 psi. This causes a large pressure equal to the pressure in the remote line 159 plus the spring pressure (in some embodiments, about 1950 psi) to be required at inlet port A to push the brake spool valve 154 open. This large restriction at the brake spool valve 154 causes an increase in hydraulic pressure along the first portion of the outlet line 128*a* between the spool valve 154 and the outlet 150 of the motor 130. When pressure is increased on the first portion of the outlet line 128*a* to a pressure that is higher than the pressure on the inlet line 126 and at the inlet 148 of the motor 130, the inertia of the rotary reducing component 114 causes hydraulic fluid to be pumped through the hydraulic motor 130 from the inlet 148 to the outlet 150, thereby causing the motor to function as a pump. The high the pressure along the first portion of the outlet line 128*a* causes a resistive force on the motor 130 that slows the continued rotation of the hydraulic motor 130, which thereby slows the attached rotary reducing component 114.

In some embodiments, the relief pressure setting of the relief valve 156 can be adjusted to speed or slow the deceleration of the rotary reducing component 114. In some embodiments, the rotor-on valve 152 and the relief valve 156 can be combined into a single proportionally controlled relief valve.

Referring to FIG. 4, the primary hydraulic circuit 120 further includes a check valve 160 that allows make-up hydraulic fluid that has been lost through the case drain 162 to be transferred from the case drain 162 into the motor inlet 148 when the case drain pressure exceeds the inlet line pressure by a predetermined spring bias (e.g., 1 or 2 psi).

In certain examples, the hydraulic motor 130 can be a fixed displacement hydraulic motor or a variable displacement hydraulic motor. In the case of a variable displacement hydraulic motor, the displacement of the hydraulic motor 130, for each rotation of the drive shaft of the hydraulic motor 130, can be varied. In certain examples, such variation can be achieved through adjustment of the position of a structure such as a swash plate.

The primary hydraulic circuit 120 further includes an accumulator 164 for accumulating hydraulic fluid under pressure. In certain examples, the accumulator 164 is charged with pressurized hydraulic fluid from the hydraulic pump 118 when the primary hydraulic circuit 120 is being operated in the activated state in which sufficient pressure is provided at the outlet line 128*b*. In certain examples, the accumulator 164 can provide supplemental hydraulic fluid to the inlet line 126 during braking or when the primary circuit is in the semi-activated state to prevent cavitation at the motor inlet 148.

Fluid communication between the hydraulic pump 118 and the primary hydraulic circuit 120 is controlled by the control valve 138. During normal operations, and when the primary circuit is in the activated state, the control valve 138 is moved to a position to enable communication between the hydraulic pump 118 and the hydraulic motor 130. In this position, the high pressure side 144 of the hydraulic pump 118 is fluidly coupled to the inlet line 126 of the primary hydraulic circuit 120, and the outlet line 128 is fluidly connected to the tank 124 (i.e., reservoir). In this configuration, pressurized hydraulic fluid from the hydraulic pump 118 travels through the inlet line 126, passes through the hydraulic motor 130 at the inlet 148 to the outlet line 128 via outlet 150, thereby driving rotation of the hydraulic motor 130 and the corresponding rotary reducing component 114, and then returns to tank 124 through the outlet line 128.

The primary circuit 120 is also shown to include a diverter coast solenoid 166 connected to the controller 136. The diverter coast solenoid 166 has a first position and a second position. In the first position, as shown in FIG. 4, the diverter coast solenoid 166 allows hydraulic flow to recirculate in the primary circuit 120 from the outlet line 128 to the inlet line 126 when the primary circuit 120 is in the deactivated state and the brake 132 is triggered. By recirculating flow, the diverter coast solenoid 166 helps to prevent cavitation at the inlet 148 of the motor 130 when fluid flow is no longer being received from the pump 118. Such recirculation will continue until the brake 132 is no longer applied or until the rotary reducing component 114 has stopped rotating. The diverter coast solenoid 166 can also help to provide fluid flow from the outlet line 128 when the primary circuit 120 is in the semi activated state, such as from the accumulator 164.

To help recirculate fluid to the diverter coast solenoid 166 during braking, the primary circuit 120 also includes a backpressure check valve 168 that helps to prevent flow back to the pump 118 when the diverter coast solenoid 166 is in the first position. The backpressure check valve 168 has a higher pressure setting than the pressure setting of the diverter coast solenoid 166 when the diverter coast solenoid 166 is in the first position. In some embodiments, the pressure setting of the diverter coast solenoid 166 is about 50 psi when in the first position, and the pressure setting of the backpressure check valve 168 is about 90 psi.

When the diverter coast solenoid 166 is in the second position, flow is allowed to flow from the inlet line 126, immediately to the outlet line 128 and then to the tank 124. This allows hydraulic fluid from the vehicle 104 to bypass the motor 130 and go directly to the outlet line 128. This can be particularly useful to brake the rotary reducing component 114 when the hydraulic system is still in the activated state. When in the activated state, full flow is being provided to the inlet 148 of the motor, thereby creating a working pressure load on the motor 130. Further, the rotating rotary reducing component 114 creates an inertial energy load due to the size of the rotary reducing component 114 rotating at speed. Therefore, in order to brake the rotary reducing component 114 when full flow is being provided at the inlet 148 of the motor 130, the brake 132 must overcome both the working pressure load and the inertial load of the rotary reducing component 114. Overcoming both of these loads could cause a large amount of undesirable heat buildup in the brake spool valve 154. Therefore, by diverting flow to the diverter coast solenoid 166 immediately to the outlet line 128 when the primary circuit is in the activated state, the brake spool valve 154 only has to dissipate the inertial energy of the rotary reducing component 114, thereby reducing the potential for heat generation during the braking sequence.

The primary circuit 120 is also shown to include the sensor 134 positioned at the inlet line 126 and in communication with the controller 136. In the depicted embodiment, the sensor 134 is a pressure transducer, but it could be, for example, a flow sensor. The sensor 134 is shown positioned downstream of a filter 170 and upstream of a flow check valve 172 on the inlet line 126. In some embodiments, the pressure setting of the flow check valve 172 is about 50 psi. In some embodiments, the flow check valve 172 sets a flow, or activated, pressure that is required to provide flow to the inlet 148 of the motor 130. Because the flow check valve 172 will not permit through flow therethrough until its pressure setting is met on the inlet line 126, anything below such a pressure setting will indicate that the primary circuit 120 is in the deactivated state. The controller 136 can be programmed to associate a measured pressure reading from the sensor 134 that is less than or equal to the flow check valve pressure setting with the deactivated state of the primary circuit 120. Further, the controller 136 can also be programmed to associate a measured pressure reading from the sensor 134 that is greater than the flow check valve pressure setting with the activated, or semi-activated, state of the primary circuit 120.

As noted above, when the controller 136 senses that the primary circuit 120 is in the deactivated state, the controller 136 de-energizes the rotor-on valve 152, thereby maximizing restriction through the brake spool valve 154 to provide a braking force. Alternatively, when the controller 136 senses that the primary circuit 120 is in the activated or semi-activated state, the controller 136 energizes the rotor-on valve 152, thereby minimizing restriction through the spool valve 154 and allowing fluid in the outlet line 128 to flow through the spool valve 154, thereby providing no braking force.

In some embodiments, the flow check valve 172 is optionally removed from the primary circuit 120, and the controller 136 is programmed accordingly. For example, because the sensor 134 is upstream from the inlet 148, the sensor 134 will sense a pressure before flow is actually provided at the inlet 148 of the motor 130. To counteract this, when the sensor 134 measures a pressure that is representative of the primary circuit 120 being in the deactivated state, and provides such a measurement as an input into the controller 136, a time delay from when the controller 132 provides an output signal to the rotor-on valve 152 can be employed.

As noted above, FIG. 4 shows the primary circuit 120 in the deactivated state, when the brake is triggered. When it is desired to stop rotation of the rotary reducing component 114, the control valve 138 is moved to a closed position in which the inlet line 126 of the primary circuit 120 is disconnected from the hydraulic pump 118, and the outlet line 128 is disconnected from tank 124. When this occurs, the hydraulic pressure at the inlet line 126 decreases to the point where the sensor 134 measures a pressure reading that is associated at the controller 136 with the deactivated state of the primary circuit 120. The controller 136 then de-energizes the rotor-on valve 152. The inertia of the rotary reducing component 114 causes hydraulic fluid to be pumped through the hydraulic motor 130 from the inlet 148 to the outlet 150. As this occurs, the restriction caused by the brake spool valve 154 causes the hydraulic pressure at the outlet line 128 to increase, thereby providing a braking function that resists continued rotation of the hydraulic motor 130.

FIG. 5 shows the primary circuit 120 in the activated state, when the brake 132 is not triggered. The boom control valve 142 is in a closed position. The control valve 138 is in an open position in which the inlet line 126 of the primary circuit 120 is connected to the hydraulic pump 118, and the outlet line 128 is connected to the tank 124. When this occurs, the hydraulic pressure at the inlet line 126 increases to the point where the sensor 134 measures a pressure reading that the controller 136 associates with the activated state of the primary circuit 120. The controller 136 then energizes the rotor-on valve 152. As pressurized fluid is provided to the inlet 148 of the motor 130, the motor 130 powers the rotation of the rotary reducing component 114. Low pressure fluid exits the motor 130 at the outlet 150 and travels along the first portion of the outlet line 128*a*. The hydraulic fluid flows through the brake spool valve 154 with minimal restriction, along the outlet line 128, through the backpressure check valve 168, and to the tank 124.

FIG. 6 shows the primary circuit 120 in the semi-activated state, with the brake 132 not triggered. The primary circuit 120 has changed from the activated state to the semi-activated states by engaging the secondary boom function. In this scenario, the pressure was at the high pressure associated with the activated state (e.g., greater than 500 psi) and dropped to the pressure associated with the semi-activated state (e.g., between about 100-500 psi). The boom control valve 142 and the control valve 138 are in the open positions, thereby providing fluid flow from the pump 118 to the hydraulic lift cylinders 110 of the secondary circuit 122 and the inlet line 126 of the primary circuit 120. The outlet line 128 is also connected to tank 124. When this occurs, the hydraulic pressure at the inlet line 126 increases to the point where the sensor 134 measures a pressure reading that is associated at the controller 136 with the semi-activated state of the primary circuit 120. In some embodiments, the controller 136 behaves identical to the how it behaves when sensing the primary circuit 120 is in the activated state. However, the pressure provided at the inlet line 126 is lower than the pressure provided at the inlet line 126 when the primary circuit 120 is in the activated state. This is due the fact that that the hydraulic lift cylinders 110 of the secondary circuit 122 are also demanding flow from the pump 118, thereby reducing the flow provided to the primary circuit 120 because the pump 118 is unable to provide sufficient flow for both the main circuit and the boom circuit simultaneously. As shown, the controller 136 energizes the rotor-on valve 152, allows fluid flow through the brake spool valve 154 with minimum restriction. In certain scenarios, the fluid provided to the inlet 148 of the motor 130 is not provided at a high enough pressure. To counteract this, low pressure fluid can be supplied to the inlet line 126 via the diverter coast solenoid 166 and the make-up check valve 160 can supply make-up oil from the case drain 162. Low pressure fluid also exits the motor 130 at the outlet 150 and travels along the outlet line 128.

Figure 7:
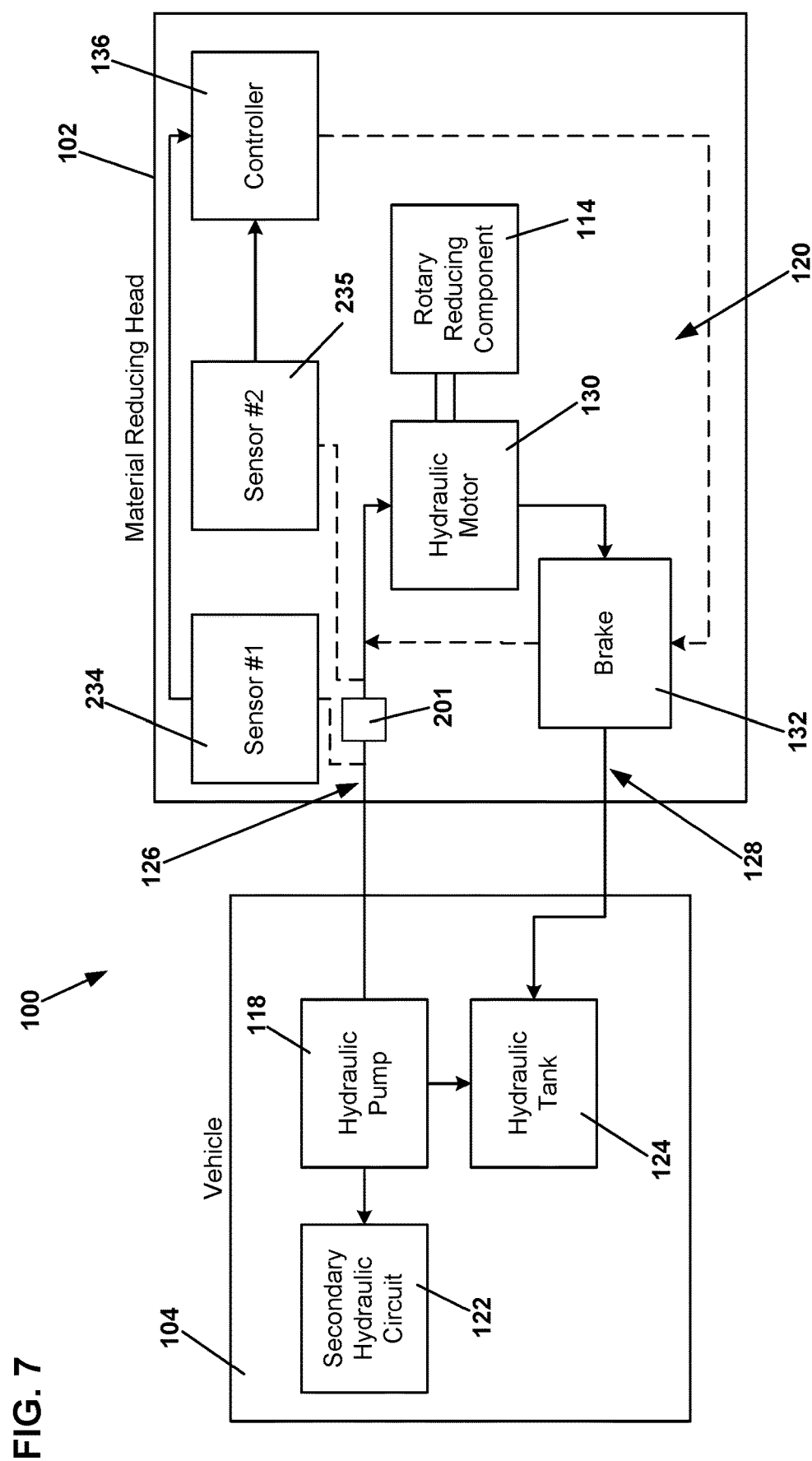
FIG. 7 illustrates a schematic of a material reducing apparatus, according to one embodiment of the present disclosure.

FIG. 7 shows a schematic representation of the vehicle 104 and the material reducing head 102, according to one embodiment of the present disclosure. In the depicted embodiment, the orientation and operation of the components of primary and secondary circuits 120, 122 remain substantially the same as shown and described above with respect to FIGS. 3-6. However, in the embodiment shown in FIG. 7, the primary circuit 120 includes at least one pair of sensors 234, 235 and a restriction element 201.

The pair of sensors 234, 235 is shown positioned in communication with the inlet line 126 and in communication with the controller 136. Specifically, the first sensor 234 is positioned immediately upstream of the restriction element 201 and the second sensor 235 is positioned immediately downstream of the restriction element 201. The sensors 234, 235 are configured to sense parameters representative of the primary circuit 120. Specifically, the sensors 234, 235 are configured to sense parameters of the primary circuit 120 (such as a pressure) that are representative of the activated, semi-activated, and deactivated states. In some embodiments, the sensors 234, 235 are pressure transducers that are configured to measure the hydraulic pressure at a point on the inlet line 126 immediately before the restriction element 201 and at a point on the inlet line 126 immediately after the restriction element 201.

The restriction element 201 provides a restriction to fluid flow along the inlet line 126. In some embodiments, the restriction element can be an orifice plate or an internal passage. Flow through a restriction can be shown to cause a pressure drop by the relationship $\Delta P = Flow \ast Resistance$. A negative pressure differential between sensor 235 and sensor 234 is indicative of flow from sensor 234 toward sensor 235. Similarly, no pressure differential between 235 and 234 is indicative of no flow.

The controller 136 is shown to be in communication with both the sensors 234, 235 and the brake 132. As described above, the controller 136 is configured to determine the particular state of the primary circuit 120 (i.e., activated, semi-activated, or deactivated) and control the brake 132 accordingly. In the depicted embodiment, the controller 136 calculates whether flow exists at the inlet line using input signals (i.e., measured pressures) provided by the sensors 234, 235. The controller 136 then determines the state of the primary circuit 120 by measuring the difference in pressures between the two sensors 234, 235 and comparing the difference with preset pressure difference values that are associated to the particular states of the primary circuit 120. Once the controller 136 determines the state of the primary circuit 120, the controller 136 then determines what output signal to send to the brake 132. Similar to above, the controller 136 triggers the brake 132 when the controller 136 determines the primary circuit 120 is in the deactivated state. This will cause the brake 132 to build pressure along the first portion of the outlet line 128a, thereby slowing down the motor 130 and attached rotary reducing component 114. The controller 136 does not trigger the brake 132 when controller 136 determines the primary circuit 120 is in the activated or semi-activated state. This prevents the brake 132 from building pressure at the first portion of the outlet line 128a, thereby allowing the motor 130 to continue operating without a braking force applied and thereby preventing premature braking.

In some embodiments, the controller 136 can be programmed to differentiate very low flow scenarios during start-up where it may be difficult to sense a pressure differential between the sensors 234, 235. In a start-up scenario, where the fluid flow will be very low, the brake 132 can be triggered for a set period of time (in some embodiments, the set period of time is about 15 seconds) before the brake 132 is disabled to allow for the flow to increase to a point where the fluid can power the rotary reducing component 114. In some embodiments, if the brake 132 is not disabled after startup, the flow in the circuit might not ever reach a point that is representative of the activated state, thereby leaving the circuit, and the attached rotary reducing component 114, in a perpetual state of sluggish or nonoperational behavior. In other embodiments, the controller 136 can use the pressure readings from the sensors 234, 235 in conjunction with the pressure differential between the two sensors 234, 235 to determine the state of the primary circuit 120. The controller 136 can correlate a high pressure measurement (e.g., greater than about 500 psi) by the sensors 234, 235 with no pressure differential as being representative of the primary circuit 120 being in the activated state. Alternatively, the controller 136 can correlate a low pressure measurement (e.g., less than 100 psi) by the sensors 234, 235 with no pressure differential as being representative of the primary circuit 120 being in the deactivated state. Further, a the pressure differential existing independent of a high/low pressure measured at the sensors 234, 235 can be indicative of the primary circuit 120 being in the semi-activated state.

Figure 8:
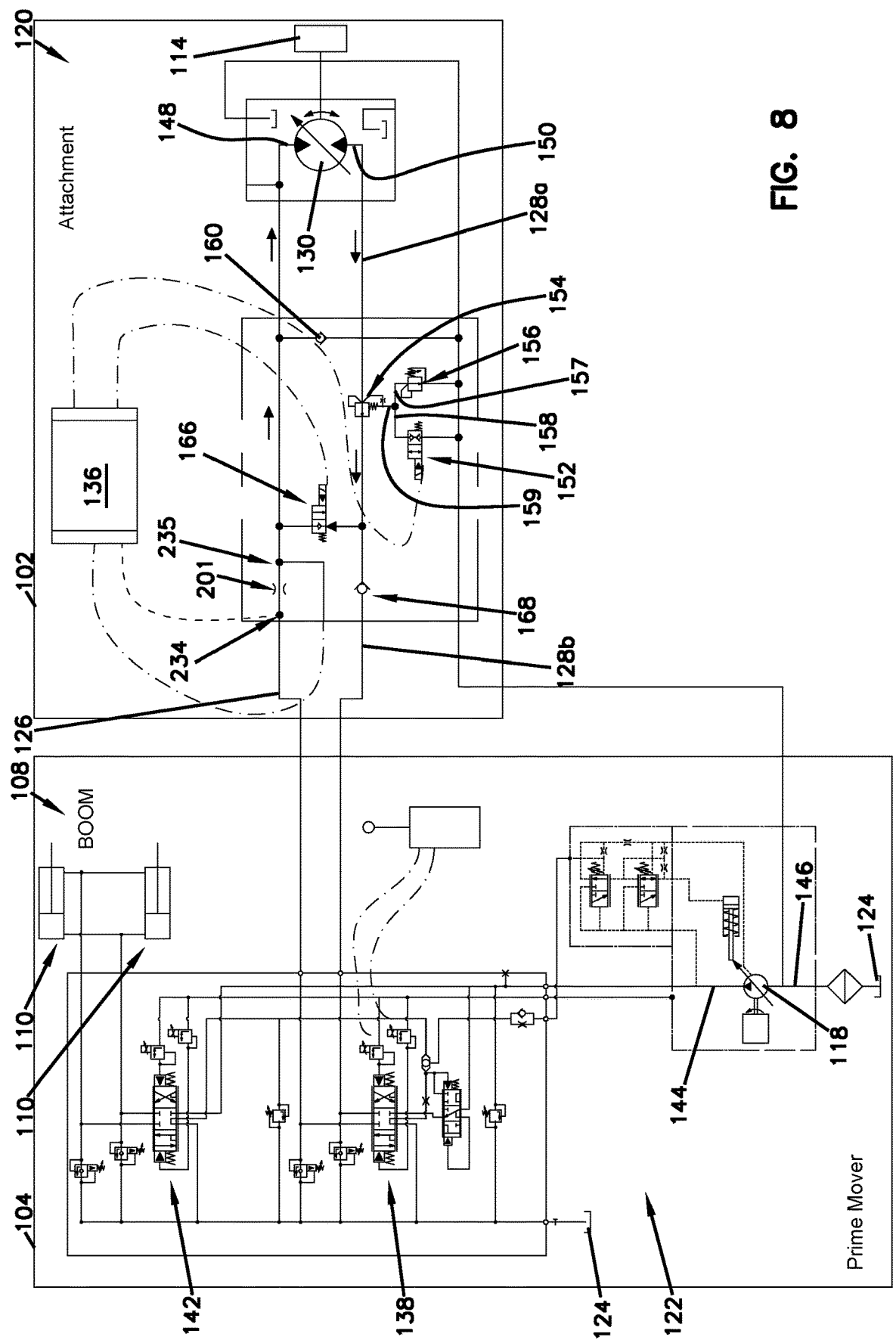
FIG. 8 illustrates a detailed schematic of the material reducing apparatus of FIG. 7 when a primary circuit is in a deactivated state, with a brake triggered.
Figure 9:
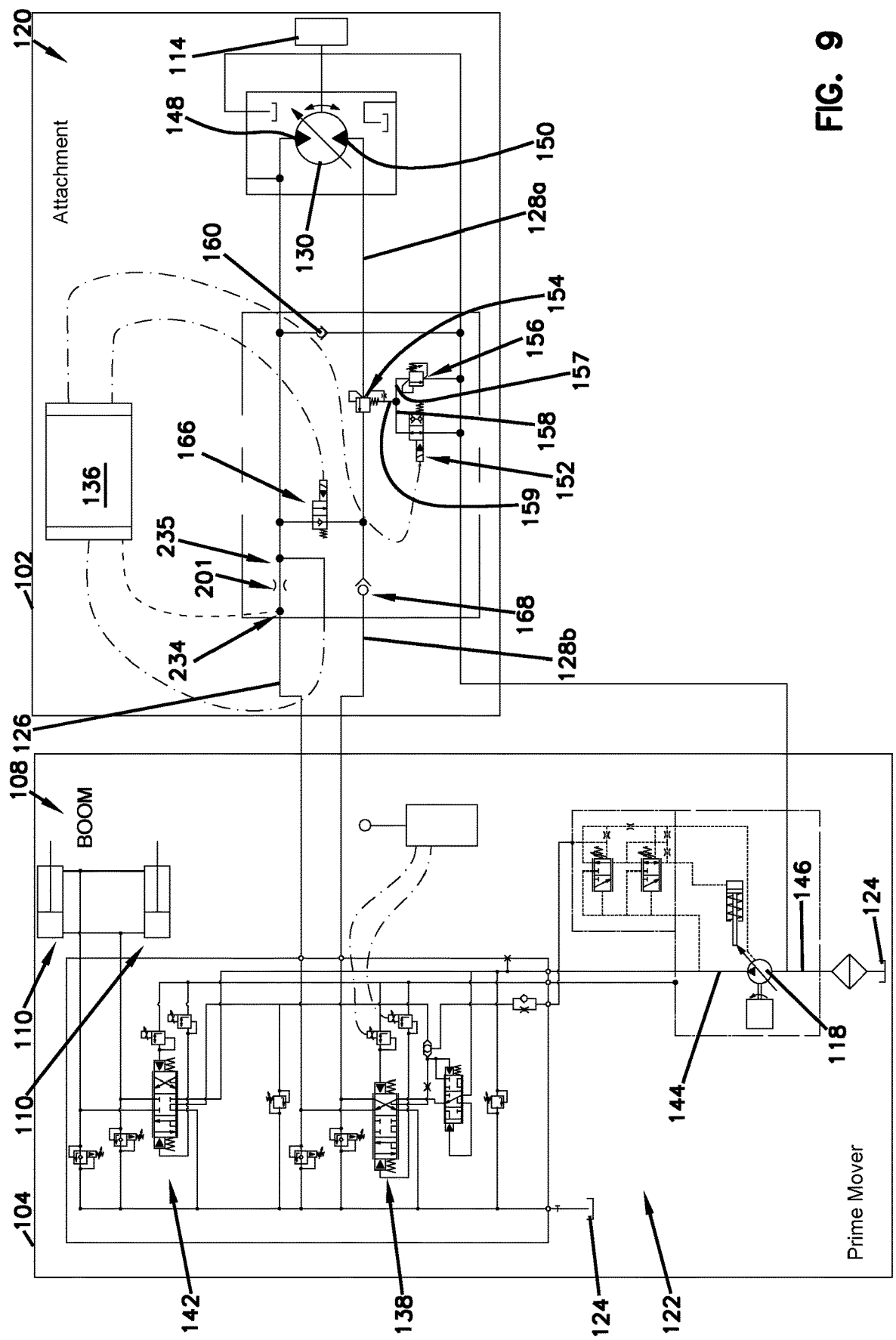
FIG. 9 illustrates a detailed schematic of the material reducing apparatus of FIG. 7 when the primary circuit is in an activated state.
Figure 10:
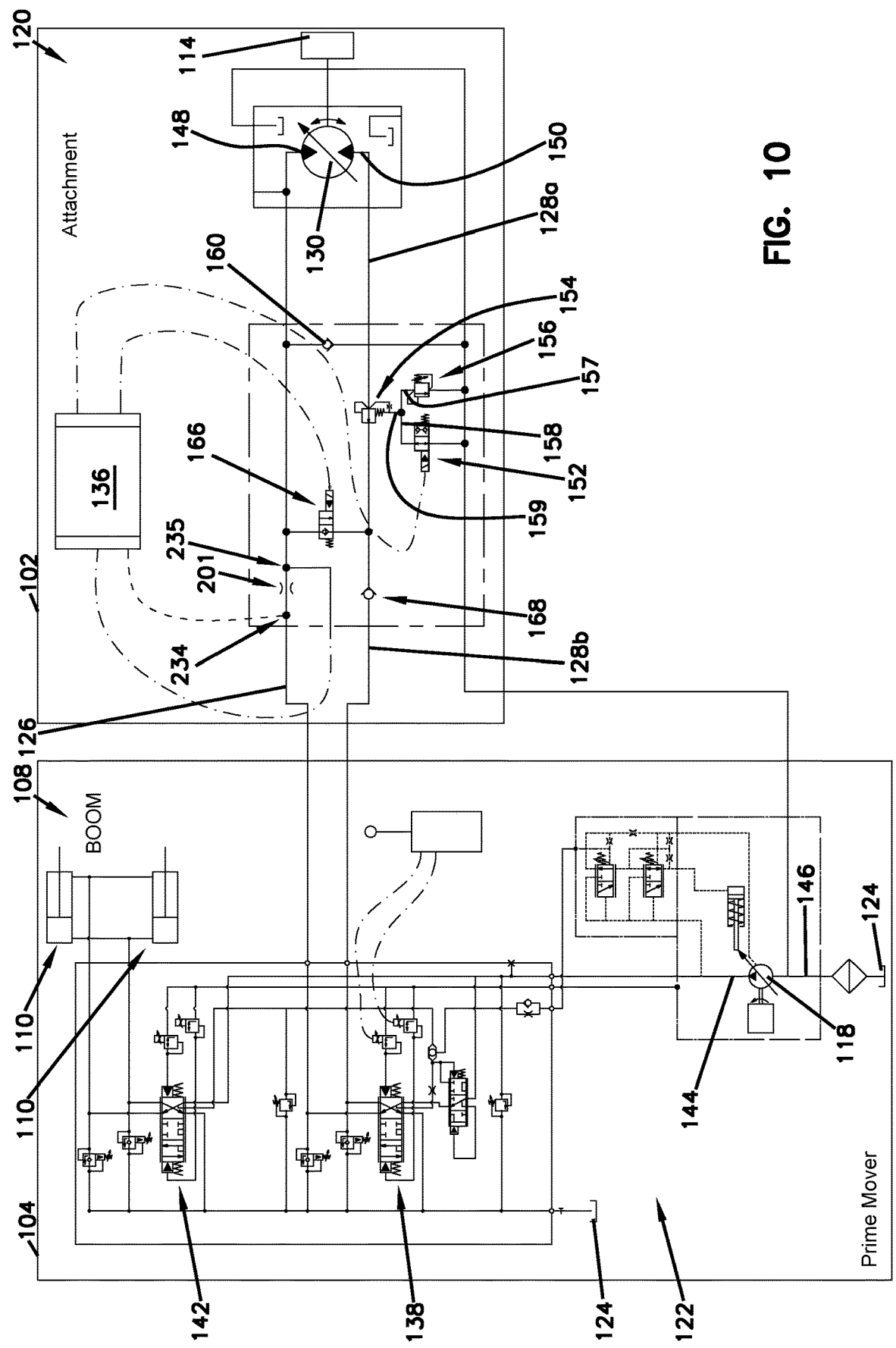
FIG. 10 illustrates a detailed schematic of the material reducing apparatus of FIG. 7 when the primary circuit is in a semi-activated state.

FIGS. 8-10 show the primary circuit 120 and the secondary circuit 122 of the material reducing head 102 and vehicle 104, respectively. The deactivated state is shown in FIG. 8, the activated state is shown in FIG. 9, and the semi-activated state is shown in FIG. 10. As shown, the primary circuit 120 includes the first and second sensors 234, 235 and the restriction element 201. Further, in the depicted embodiment, the primary circuit 120 lacks the accumulator 164 shown and described in FIGS. 4-6.

FIG. 8 shows the primary circuit 120 in the deactivated state and when hydraulic braking has been triggered. The control valve 138 is moved to a closed position, and the inlet line 126 of the primary circuit 120 is disconnected from the hydraulic pump 118, and the outlet line 128 is disconnected from tank 124. As flow decreases, the first and second sensors 234, 235 measure the pressure difference across the restriction element 201. The controller 136 then determines if the pressure difference measured in the inlet line 126 is representative of the deactivated state of the primary circuit 120. The controller 136 de-energizes the rotor-on valve 152, thereby providing a braking function that resists continued rotation of the hydraulic motor 130.

FIG. 9 shows the primary circuit 120 in the activated state, where braking is not triggered. The boom control valve 142 is in a closed position. The control valve 138 is in an open position in which the inlet line 126 of the primary circuit 120 is connected to the hydraulic pump 118, and the outlet line 128 is connected to tank 124. When this occurs, the hydraulic pressure at the inlet line 126 increases to the point where the controller 136 determines sufficient flow exists in the primary circuit 120. This is determined by measuring the difference in pressures measured at the first and second sensors 234, 235. The controller 136 determines that the pressure difference in the inlet line 126 is representative of the activated state of the primary circuit 120. The controller 136 then energizes the rotor-on valve 152 allowing low pressure fluid to exit the motor 130 at the outlet 150 and travel along the outlet line 128, unrestricted, through the backpressure check valve 168, and to tank 124.

FIG. 10 shows the primary circuit 120 in the semi-activated state, with no braking triggered. The boom control valve 142 and the control valve 138 are in the open positions, thereby providing fluid flow from the pump 118 to the hydraulic lift cylinders 110 of the secondary circuit 122 and the inlet line 126 of the primary circuit 120. The outlet line 128 is also connected to tank 124. When this occurs, the hydraulic pressure at the inlet line 126 increases to the point where the controller 136 determines sufficient flow exists in the primary circuit 120. This is determined by measuring the difference in pressures measured at the first and second sensors 234, 235. The controller 136 determines that the pressure difference in the inlet line 126 is representative of the semi-activated state of the primary circuit 120. The controller 136 then energizes the rotor-on valve 152 allowing low pressure fluid to exit the motor 130 at the outlet 150 and travel along the outlet line 128, unrestricted, through the backpressure check valve 168, and to tank 124. However, in the semi-activated state, the pressure provided at the inlet line 126 is lower than the pressure provided at the inlet line 126 when the primary circuit 120 is in the activated state. In certain scenarios, the fluid provided to the inlet 148 of the motor 130 is not provided at a high enough pressure. To counteract this, make-up fluid can be supplied to the inlet line 126 via the diverter coast solenoid 166, and the make-up check valve 160 can supply make-up oil from the case drain 162 if the pressure at the inlet 148 of the motor 130 drops to a point where the motor 130 turns into a pump.

While the present disclosure can be implemented in a rotor reducing machine, as described above, it can also be implemented in variety of other different machines. In some embodiments, the present disclosure can be used in equipment that includes large rotating elements such as cutting drums, wheels, or chains. For example, the present disclosure can be implements in machines such as brush chippers, stump cutters, trenchers, rock wheels, or other machines having large rotating bodies.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. An attachment for a tractor, the attachment comprising:
   a rotary reducing component including a plurality of cutters;
   a hydraulic system having an activated state, a semi-activated state, and a deactivated state, the hydraulic system being connected to a tractor hydraulic system of the tractor with a pump and a tank, the hydraulic system having an inlet for receiving hydraulic fluid and an outlet for discharging hydraulic fluid, the hydraulic system further including:
      a hydraulic motor positioned between the inlet and the outlet, the hydraulic motor being mechanically coupled to the rotary reducing component;
      a first sensor positioned at the inlet of the hydraulic system for sensing parameters representative of the activated, semi-activated, or deactivated states of the hydraulic system;
      a selectively operable hydraulic brake positioned downstream of the hydraulic motor, configured to restrict flow from the hydraulic motor to provide hydraulic motor braking only in the deactivated state; and
   a controller in communication with the first sensor and the hydraulic brake, wherein the controller triggers the hydraulic brake when the controller determines the first sensor senses a parameter representative of the hydraulic system being in the deactivated state, and wherein the controller disables the hydraulic brake when the controller determines the first sensor senses a parameter representative of the hydraulic system being in the activated or semi-activated state,
   wherein, when the hydraulic system is in the activated or a semi-activated state, the inlet of the hydraulic system is connected to the pump of the tractor hydraulic system, and wherein when the hydraulic system is in the deactivated state, the hydraulic system is disconnected from the pump of the tractor hydraulic system.

2. The attachment of claim 1, wherein the hydraulic system further comprises a diverter valve positioned between the inlet and the outlet of the hydraulic system, wherein the diverter valve is configured to transfer hydraulic fluid from the outlet of the hydraulic system to the inlet of the hydraulic system to control the rotation of the rotary reducing component.

3. The attachment of claim 2, wherein, the diverter valve is also configured to selectively transfer fluid from the inlet to the outlet of the hydraulic system.

4. The attachment of claim 2, wherein the hydraulic system further comprises an accumulator configured to provide fluid flow through the diverter valve to the inlet.

5. The attachment of claim 1, wherein, when the hydraulic brake is triggered, the hydraulic brake creates an increase in pressure between the hydraulic brake and the motor.

6. The attachment of claim 1, wherein the hydraulic brake includes a valve connected to the controller, wherein, when in a first position, the valve triggers the brake, wherein, when in the second position, the valve disables the brake, and wherein the valve is biased in the first position.

7. The attachment of claim 1, wherein the first sensor is a pressure transducer.

8. The attachment of claim 1, wherein the hydraulic system further comprises a check valve positioned at the inlet of the hydraulic system, and wherein the check valve is positioned downstream from the first sensor.

9. The attachment of claim 1, wherein the hydraulic system further comprises a second sensor positioned at the inlet of the hydraulic system for sensing parameters representative of the activated, semi-activated, or deactivated states of the hydraulic system, wherein the control system is in communication with the second sensor, and wherein the control system uses the parameters sensed at the first and second sensors to determine if the hydraulic system is in an activated, semi-activated, or deactivated state.

10. An attachment for a tractor, the attachment comprising:
    a rotary reducing component including a plurality of cutters;
    a hydraulic system having an activated state, a semi-activated state, and a deactivated state, the hydraulic system being connected to a tractor hydraulic system of the tractor with a pump and a tank, the hydraulic system having an inlet for receiving hydraulic fluid and an outlet for discharging hydraulic fluid, the hydraulic system further including:
       a hydraulic motor positioned between the inlet and the outlet, the hydraulic motor being mechanically coupled to the rotary reducing component;
       a restriction element positioned at the inlet, the restriction element being configured to restrict the flow of hydraulic fluid therethrough;
       a first sensor positioned at the inlet of the hydraulic system upstream of the restriction element, the first sensor being configured to sense a first parameter of the hydraulic system;
       a second sensor positioned at the inlet of the hydraulic system downstream of the restriction element, the second sensor being configured to sense a second parameter of the hydraulic system;

a selectively operable hydraulic brake positioned downstream of the hydraulic motor, configured to restrict flow from the hydraulic motor to provide hydraulic motor braking only in the deactivated state; and a controller in communication with the first sensor, the second sensor, and the hydraulic brake, wherein the controller considers the parameters sensed at the first and second sensors to determine if the hydraulic system is in the activated, semi-activated, or deactivated state, wherein the controller triggers the hydraulic brake when the hydraulic system is in the deactivated state, and wherein the controller disables the hydraulic brake when the hydraulic system is in the activated or semi-activated state, wherein, when the hydraulic system is in the activated or semi-activated state, the inlet of the hydraulic system is connected to the pump of the tractor hydraulic system, and wherein when the hydraulic system is in the deactivated state, the hydraulic system is disconnected from the pump of the tractor hydraulic system.

11. The attachment of claim 10, wherein the hydraulic system further comprises a diverter valve positioned between the inlet and the outlet of the hydraulic system, wherein, when in a first position, the diverter valve is configured to selectively transfer hydraulic fluid from the outlet of the hydraulic system to the inlet of the hydraulic system to control the rotation of the rotary reducing component.

12. The attachment of claim 11, wherein, when in a second position, the diverter valve is also configured to selectively transfer fluid from the inlet to the outlet of the hydraulic system.

13. The attachment of claim 11, wherein the hydraulic system further comprises an accumulator configured to provide fluid flow through the diverter valve to the inlet.

14. The attachment of claim 10, wherein, when the hydraulic brake is triggered, the hydraulic brake creates an increase in pressure between the hydraulic brake and the hydraulic motor.

15. The attachment of claim 10, wherein the hydraulic brake includes a valve connected to the controller, wherein, when in a first position, the valve triggers the hydraulic brake, wherein, when in the second position, the valve disables the hydraulic brake, and wherein the valve is biased in the first position.

16. The attachment of claim 10, wherein the first and second sensors are pressure transducers.

17. An attachment for a tractor, the attachment comprising:

a rotary reducing component including a plurality of cutters;

a hydraulic system having an activated state, semi-activated state, and a deactivated state, the hydraulic system being connected to a tractor hydraulic system of the tractor with a pump and a tank, the hydraulic system having an inlet for receiving hydraulic fluid and an outlet for discharging hydraulic fluid, the hydraulic system further including:

a hydraulic motor positioned between the inlet and the outlet, the hydraulic motor being mechanically coupled to the rotary reducing component;

a pressure transducer positioned at the inlet of the hydraulic system for sensing a pressure representative of the activated, semi-activated, or deactivated states of the hydraulic system;

a check valve positioned at the inlet of the hydraulic system, wherein the check valve is positioned downstream from the pressure transducer; and a hydraulic brake positioned downstream of the hydraulic motor at the outlet of the hydraulic system, the hydraulic brake being configured to control the rotation of the rotary reducing component when triggered, the hydraulic brake further including a remote valve having first and second positions, wherein, when in a first position, the remote valve triggers the hydraulic brake, wherein, when in the second position, the remote valve disables the hydraulic brake, and wherein the remote valve is biased in the first position; and a controller in communication with the first sensor and the hydraulic brake, wherein the controller moves the remote valve to the first position when the controller determines the pressure transducer senses a pressure representative of the hydraulic system being in the deactivated state, and wherein the controller moves the remote valve to the second position when the controller determines the pressure transducer senses a pressure representative of the hydraulic system being in the activated state or semiactivated state, wherein, when the hydraulic system is in the activated or semi-activated state, the inlet of the hydraulic system is connected to the pump of the tractor hydraulic system, and wherein when the hydraulic system is in the deactivated state, the hydraulic system is disconnected from the pump of the tractor hydraulic system.

18. The attachment of claim 17, wherein the hydraulic system further comprises a diverter valve positioned between the inlet and the outlet of the hydraulic system, wherein the diverter valve is configured to transfer hydraulic fluid from the outlet of the hydraulic system to the inlet of the hydraulic system to control the rotation of the rotary reducing component.

19. The attachment of claim 18, wherein the hydraulic system further comprises an accumulator configured to provide fluid flow through the diverter valve to the inlet.

* * * * *